United States Patent
Park

(10) Patent No.: US 8,802,248 B2
(45) Date of Patent: Aug. 12, 2014

(54) BATTERY PACK HAVING PROTECTION FROM STATIC ELECTRICITY

(75) Inventor: Chilsung Park, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 230 days.

(21) Appl. No.: 12/968,691

(22) Filed: Dec. 15, 2010

(65) Prior Publication Data

US 2011/0143172 A1    Jun. 16, 2011

(30) Foreign Application Priority Data

Dec. 16, 2009  (KR) .......................... 10-2009-0125767

(51) Int. Cl.
*H01M 2/00* (2006.01)

(52) U.S. Cl.
USPC ................. 429/7; 429/164; 429/65; 429/121

(58) Field of Classification Search
CPC ..................... H01M 10/4257; H01M 2200/00
USPC ...................................... 429/1–400
See application file for complete search history.

(56) References Cited

U.S. PATENT DOCUMENTS

| | | | |
|---|---|---|---|
| 5,227,614 A | 7/1993 | Danielson et al. | |
| 6,316,915 B1 | 11/2001 | Fujiwara et al. | |
| 6,700,766 B2 | 3/2004 | Sato | |
| 7,365,952 B2 | 4/2008 | Sato | |
| 7,531,988 B2 | 5/2009 | Sato | |
| 2001/0051298 A1 | 12/2001 | Hanafusa et al. | |
| 2002/0039270 A1 | 4/2002 | Sato | |
| 2003/0115001 A1 | 6/2003 | Odaohhara | |
| 2004/0109274 A1 | 6/2004 | Sato | |
| 2005/0184313 A1 | 8/2005 | Han et al. | |
| 2006/0014309 A1* | 1/2006 | Sachdev et al. ................. 438/17 |
| 2006/0093898 A1 | 5/2006 | Kwak et al. | |
| 2008/0158755 A1 | 7/2008 | Sato | |
| 2008/0226979 A1* | 9/2008 | Jang .............................. 429/164 |
| 2008/0226980 A1* | 9/2008 | Kim .............................. 429/164 |
| 2008/0239603 A1 | 10/2008 | Bruce et al. | |
| 2009/0039833 A1 | 2/2009 | Kitagawa | |
| 2009/0263711 A1* | 10/2009 | Kim et al. ..................... 429/164 |
| 2010/0075205 A1* | 3/2010 | Kwag et al. ..................... 429/61 |

FOREIGN PATENT DOCUMENTS

| | | |
|---|---|---|
| JP | 2006-172942 | 6/2006 |
| KR | 10-2004-0107052 | 12/2004 |
| KR | 10-2005-0003514 | 1/2005 |

(Continued)

OTHER PUBLICATIONS

Korean Office Action issued by KIPO, dated May 3, 2011, corresponding to Korean Patent Application No. 10-2009-0125767, together with Request for Entry.

*Primary Examiner* — Milton I Cano
*Assistant Examiner* — Ling R Zeng
(74) *Attorney, Agent, or Firm* — Robert E. Bushnell, Esq.

(57) ABSTRACT

In a battery pack, an electrostatic protective part is disposed on a side surface of a protective circuit module so as to protect the protective circuit module from static electricity introduced from the outside, thus improving the reliability of a battery. The battery pack includes a battery cell, a protective circuit module electrically connected to the battery cell and including an electrostatic protective part on a side surface thereof, and a case accommodating the battery cell and the protective circuit module. The electrostatic protective part is formed by applying solder on a conductive foil.

10 Claims, 3 Drawing Sheets

(56) References Cited

FOREIGN PATENT DOCUMENTS

| KR | 10-2005-0086017 | 8/2005 |
| KR | 10-2008-0084237 | 9/2008 |
| KR | 1020080084237 A | 9/2008 |

\* cited by examiner

BATTERY PACK HAVING PROTECTION FROM STATIC ELECTRICITY

CLAIM OF PRIORITY

This application makes reference to, incorporates the same herein, and claims all benefits accruing under 35 U.S.C. §119 from an application earlier filed in the Korean Intellectual Property Office on 16 Dec. 2009 and there duly assigned Korean Patent Application No. 10-2009-0125767.

BACKGROUND OF THE INVENTION

1. Field of the Invention

The present invention relates to a battery pack, and more particularly to a battery pack in which a protective circuit module is protected from static electricity, thereby improving the reliability of the battery.

2. Description of the Related Art

In general, a secondary battery is provided with a protective circuit module, considering stability. Such a protective circuit module provided in a secondary battery is fabricated by forming a printed circuit pattern on an insulating substrate, and then, by attaching a plurality of semiconductor devices and a protective circuit to the printed circuit pattern.

SUMMARY OF THE INVENTION

The present invention is directed to a battery pack which substantially overcomes one or more of the problems due to the limitations and disadvantages of the related art.

It is therefore a feature of an embodiment to provide a battery pack which can improve the reliability of a battery.

At least one of the above and other features and advantages may be realized by providing a battery pack which includes: a battery cell; a protective circuit module electrically connected to the battery cell and including an electrostatic protective part on a side surface thereof; and a case accommodating the battery cell and the protective circuit module; wherein the electrostatic protective part surrounds the side surface of the protective circuit module.

The protective circuit module may include a printed circuit board, the printed circuit board including a first flat surface, a second flat surface disposed opposite to the first surface, and a third surface connecting the first and second surfaces, the electrostatic protective part being disposed across the first surface, the second surface and the third surface of the printed circuit board.

The electrostatic protective part may be electrically connected to a ground of the protective circuit module. The electrostatic protective part may be connected to a positive or negative terminal of the battery cell.

The electrostatic protective part may be disposed near a semiconductor device mounted on the protective circuit module. The electrostatic protective part may be disposed near a pattern connected to a semiconductor device mounted on the protective circuit module.

The case may include a top case and a bottom case coupled to the top case, and the electrostatic protective part may be disposed at a portion facing a coupling portion between the top case and the bottom case.

The electrostatic protective part may be formed by applying solder on a conductive foil. The conductive foil may be a copper foil. The conductive foil may be formed through a plating process.

The solder may be formed on a surface of the conductive foil through a plating process. The solder may be formed of any one of $Sn_{37}Pb$, $Sn_{95}Pb$, SnAg, SnAu, SnCu, SnZn, SnZnBi, SnAgCu, and SnAgBi.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

In general, a secondary battery is provided with a protective circuit module, considering stability. Such a protective circuit module provided in a secondary battery is fabricated by forming a printed circuit pattern on an insulating substrate, and then, by attaching a plurality of semiconductor devices and a protective circuit to the printed circuit pattern. The protective circuit module undergoes an electrostatic test which is one of several stability tests. In this case, the semiconductor devices and the protective circuit mounted on the protective circuit module may be burned or melted by static electricity generated in the electrostatic test. This causes a short circuit between the semiconductor devices or within the protective circuit, and thus the protective circuit module may work imperfectly.

Exemplary embodiments will now be described more fully hereinafter with reference to the accompanying drawings. However, they may be embodied in different forms and the invention should not be construed as limited to the embodiments set forth herein. Rather, these embodiments are provided so that this disclosure will be thorough and complete, and will fully convey the scope of the invention to those skilled in the art.

Hereinafter, embodiments will be described in detail with reference to the accompanying drawings.

Figure 1:
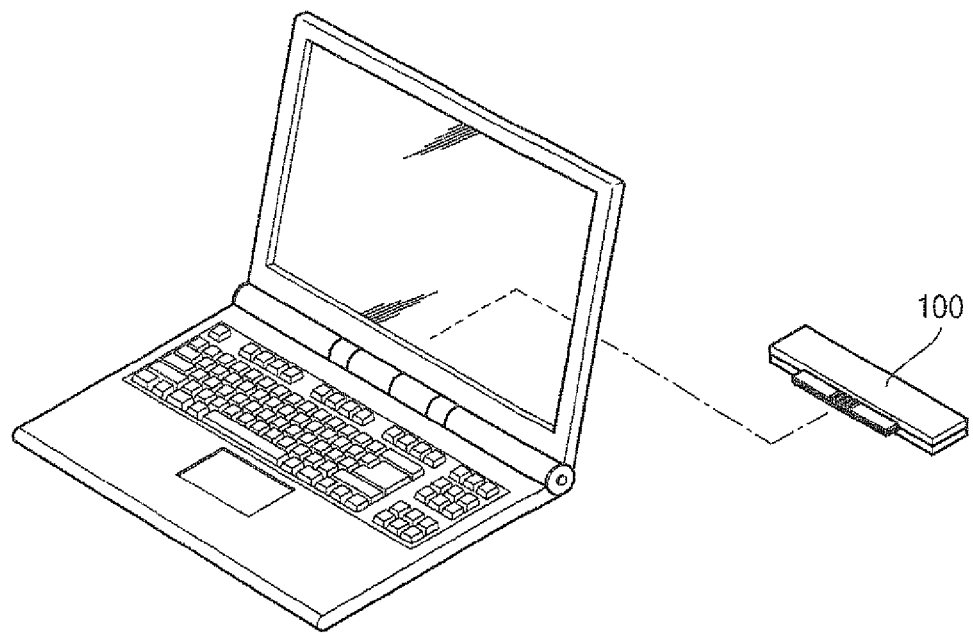
FIG. 1 is a perspective view illustrating a battery pack installed on an external device, according to an embodiment of the invention.

FIG. 1 is a perspective view illustrating a battery pack installed on an external device, according to an embodiment of the invention.

In general, a secondary battery is rechargeable and has a battery pack shape which is installed on an external device, such as a notebook computer, as illustrated in FIG. 1. As such, secondary batteries are widely used as power sources.

Figure 2:
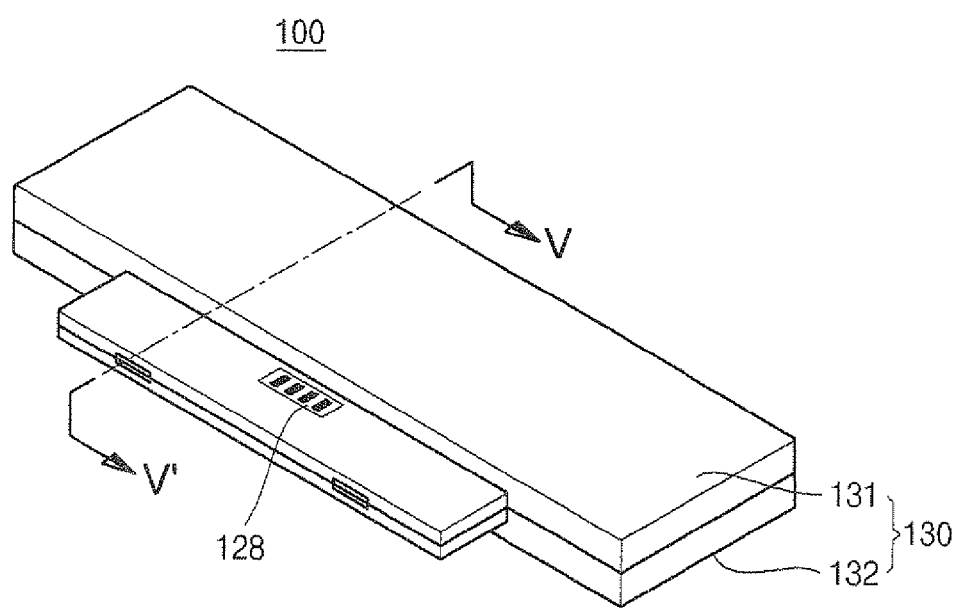
FIG. 2 is an enlarged perspective view illustrating the battery pack of FIG. 1.
Figure 3:
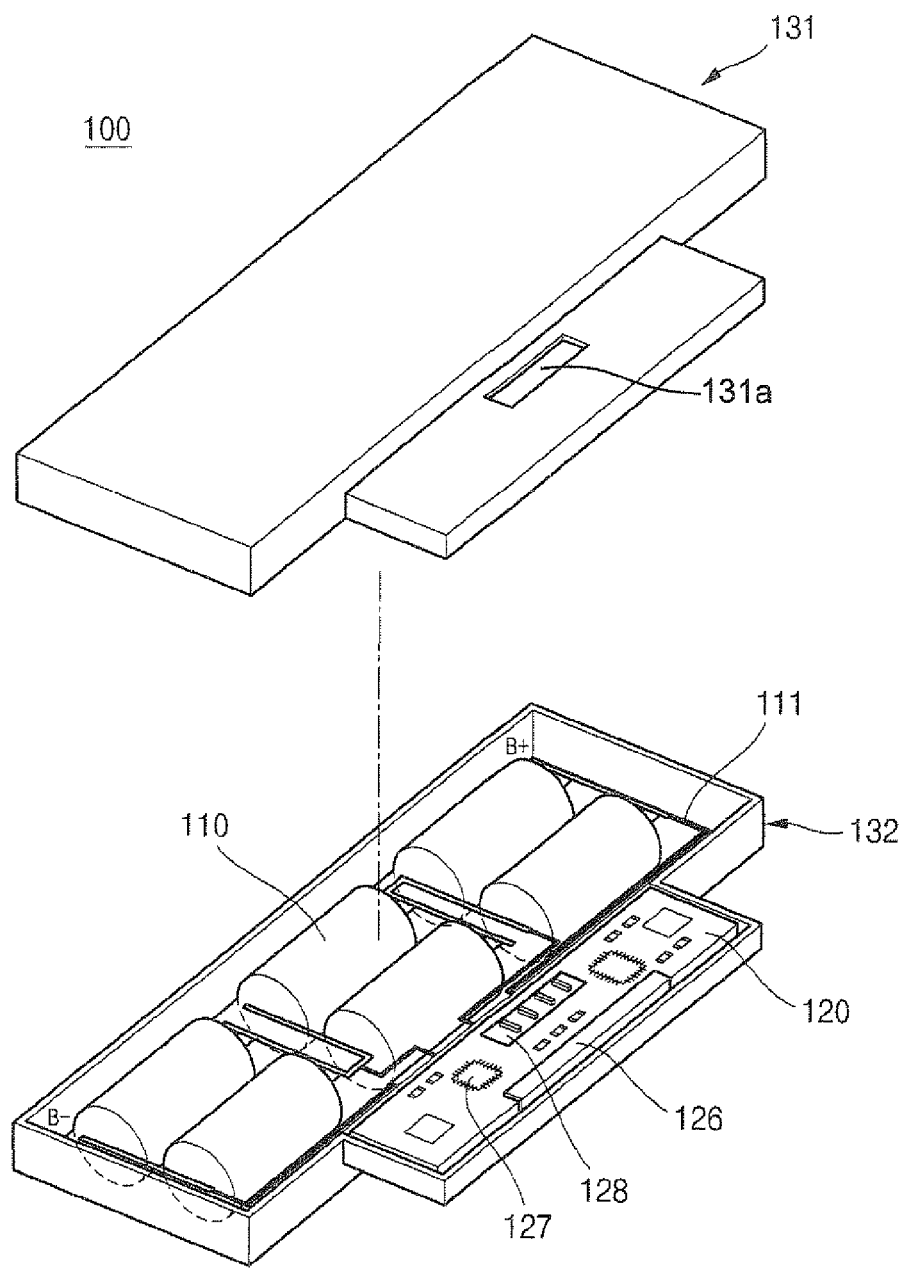
FIG. 3 is an exploded perspective view illustrating the battery pack of FIG. 1.
Figure 4:
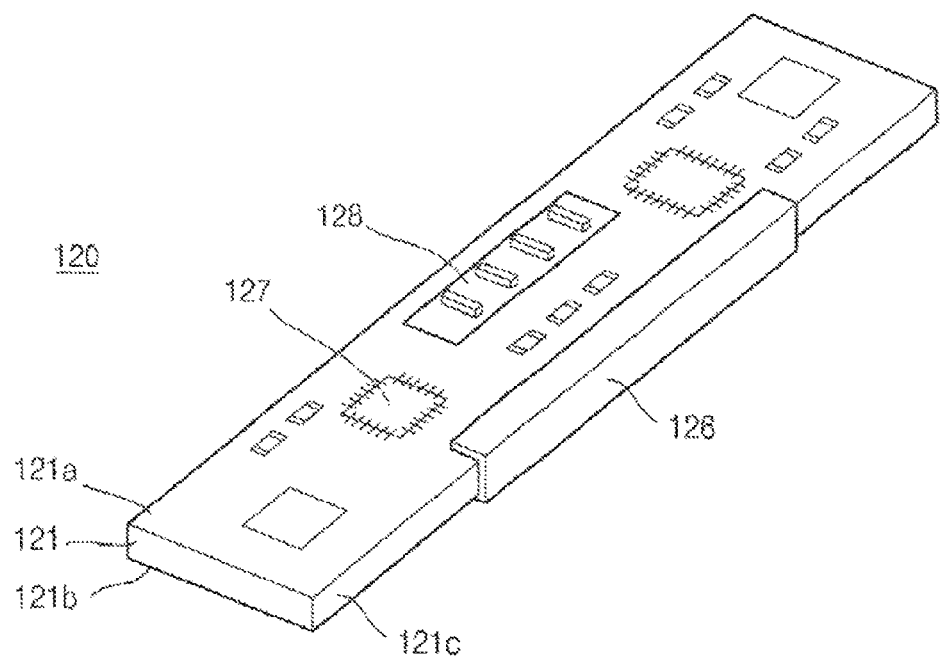
FIG. 4 is a perspective view illustrating a protective circuit module illustrated in FIG. 3.
Figure 5:
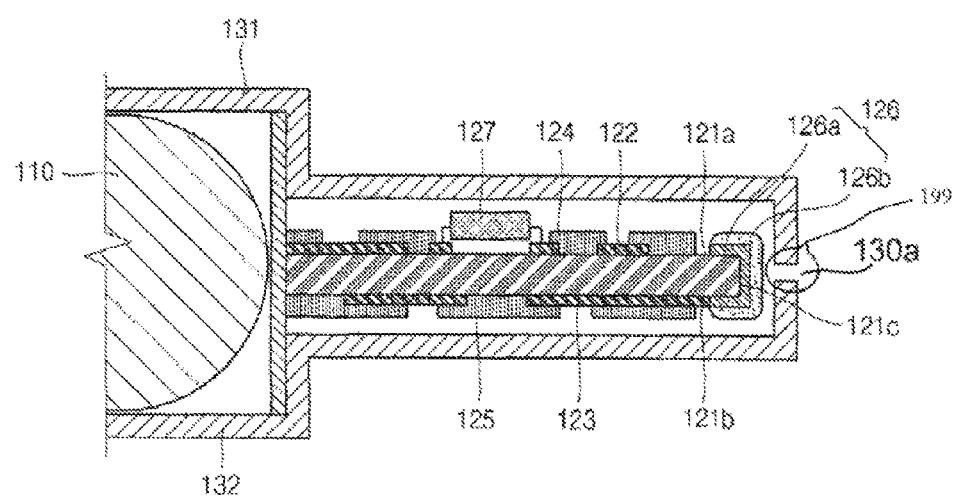
FIG. 5 is a cross-sectional view taken along line V-V' of FIG. 2.

FIG. 2 is an enlarged perspective view illustrating the battery pack of FIG. 1, FIG. 3 is an exploded perspective view illustrating the battery pack of FIG. 1, FIG. 4 is a perspective view illustrating a protective circuit module illustrated in FIG. 3, and FIG. 5 is a cross-sectional view taken along line A-A' of FIG. 2.

Referring to FIGS. 2 thru 5, a battery pack 100 includes battery cells 110, a protective circuit module 120 electrically connected to the battery cells 110 and including an electrostatic protective part 126 on a side surface thereof, and a case 130 accommodating the protective circuit module 120 and including a top case 131 and a bottom case 132.

The battery cells 110 are designed such that their upper surfaces have different poles from those of the lower surfaces. In the drawings, the upper surfaces having convex terminal shapes have positive poles, and the lower surfaces having flat shapes have negative poles. It is assumed that the upper surfaces of the battery cells 110 are electrically connected to positive electrodes of electrode assemblies (not shown) disposed in the battery cells 110, and that the lower surfaces are electrically connected to negative electrodes of the electrode assemblies disposed in the battery cells 110. Rechargeable cylinder type secondary batteries are used as the battery cells 110. Although the number of the battery cells 110 illustrated in FIG. 3 is six, the present disclosure is not limited thereto. In FIG. 3, B+ and B− denote large current terminals and power source parts at both ends of the battery cells 110 connected in series/parallel. B+ denotes the highest potential terminal, which is a positive terminal of the battery cells 110. B− denotes the lowest potential terminal, which is a negative terminal of the battery cells 110. The large current terminals may be connected with a conductive tab 111 for drawing power. The conductive tab 111 may be formed of any one of nickel (Ni), copper (Cu), aluminum (Al), and an equivalent thereof, but the present disclosure is not limited thereto.

The protective circuit module 120 is electrically connected to the battery cells 110 through the conductive tab 111 so as to prevent overcharge/overdischarge of the battery cells 110. The protective circuit module 120 includes a plurality of semiconductor devices 127 which are connected to an external device through a connector 128. The protective circuit module 120 may be laid at a side portion of the battery cells 110. That is, the upper surface of the protective circuit module 120 faces the top case 131, and the lower surface of the protective circuit module 120 faces the bottom case 132.

As seen in FIGS. 4 and 5, the protective circuit module 120 includes a printed circuit board 121, a first interconnection pattern 122, a second interconnection pattern 123, a first passivation layer 124, and a second passivation layer 125. The printed circuit board 121 includes a first flat surface 121a, a second flat surface 122b disposed opposite to the first surface 121a, and a third surface 121c connecting the first and second surfaces 121a and 121b. The first interconnection pattern 122 is provided on the first surface 121a of the printed circuit board 121. The second interconnection pattern 123 is provided on the second surface 121b of the printed circuit board 121. The first passivation layer 124 is provided on the first surface 121a of the printed circuit board 121 and exposes a portion of the first interconnection pattern 122. The second passivation layer 125 is provided on the second surface 121b of the printed circuit board 121 and exposes a portion of the second interconnection pattern 123. The protective circuit module 120 further includes the electrostatic protective part 126 disposed on its side surface 121c.

The printed circuit board 121 may have a multi layered structure. The printed circuit board 121 includes metal interconnections in each layer so as to rearrange connections between the first interconnection pattern 122 and the second interconnection pattern 123 and to prevent a short circuit between patterns.

The first interconnection pattern 122 is disposed on the first surface 121a of the printed circuit board 121. The first interconnection pattern 122 may be electrically connected to the second interconnection pattern 123 through a conductive via (not shown). The first interconnection pattern 122 may be formed of copper (Cu), titanium (Ti), nickel (Ni), palladium (Pd), or an equivalent thereof, but the present disclosure is not limited thereto. The first interconnection pattern 122 may be a ground interconnection pattern, an interconnection pattern connected to the positive terminal or negative terminal of the battery cell 110, or an interconnection pattern connected to the semiconductor device 127.

The second interconnection pattern 123 is disposed on the second surface 121b of the printed circuit board 121. The second interconnection pattern 123 may be electrically connected to the first interconnection pattern 122 through the conductive via (not shown). The second interconnection pattern 123 may be identical in material to the first interconnection pattern 122. The second interconnection pattern 123 may be a ground interconnection pattern, an interconnection pattern connected to the positive terminal or negative terminal of the battery cell 110, or an interconnection pattern connected to the semiconductor device 127.

The first passivation layer 124 has a constant thickness on the first surface 121a of the printed circuit board 121 at the periphery of the first interconnection pattern 122 so as to protect the first interconnection pattern 122 from the environment. That is, the first passivation layer 124 is disposed on the first surface 121a of the printed circuit board 121 and exposes a portion of the first interconnection pattern 122 to the outside. The first passivation layer 124 may be formed of any one of polyimide, epoxy, benzo cyclo butene (BCB), poly benz oxazole (PBO), oxide, nitride, and an equivalent thereof, but the present disclosure is not limited thereto.

The second passivation layer 125 has a constant thickness on the second surface 121b of the printed circuit board 121 at the periphery of the second interconnection pattern 123 so as to protect the second interconnection pattern 123 from the environment. That is, the second passivation layer 125 is disposed on the second surface 121b of the printed circuit board 121 and exposes a portion of the second interconnection pattern 123 to the outside. The second passivation layer 125 may be identical in material to the first passivation layer 124.

The electrostatic protective part 126 is disposed on the side surface of the protective circuit module 120, and is disposed across the first surface 121a, the second surface 121b, and the third surface 121c of the printed circuit board 121 so as to surround the side surface of the protective circuit module 120, thus providing shielding from static electricity introduced between the layers of the printed circuit board 121. The electrostatic protective part 126 may be disposed on the side surface of the protective circuit module 120 near the semiconductor device 127. Alternatively, the electrostatic protective part 126 may be disposed near a pattern connected to the semiconductor device 127.

The electrostatic protective part 126 may be electrically connected to a ground of the protective circuit module 120. Alternatively, the electrostatic protective part 126 may be connected to the positive or negative terminal of the battery cell 110 through an interconnection pattern. The electrostatic protective part 126 absorbs static electricity introduced from the outside so as to protect the protective circuit module 120 from the static electricity.

As such, the electrostatic protective part 126 is disposed near the semiconductor device 127 susceptible to static electricity, or near a pattern connected to the semiconductor device 127, so as to protect the semiconductor device 127 from the static electricity.

In addition, the electrostatic protective part 126 transmits static electricity introduced from the outside to the ground to prevent breakage of the semiconductor device 127, thus protecting the protective circuit module 120.

Alternatively, the electrostatic protective part 126 transmits static electricity introduced from the outside to the positive or negative terminal of the battery cell 110 where a large current flows so as to prevent breakage of the semiconductor device 127, thus protecting the protective circuit module 120. In this case, since the large current flowing along the positive and negative terminals of the battery cell 110 is larger than that of the static electricity, the introduction of the static electricity does not affect the battery cell 110.

The electrostatic protective part 126 includes a conductive foil 126a and solder 126b disposed on a surface of the conductive foil 126a. The conductive foil 126a may be a copper foil. Since the conductive foil 126a is formed of conductive material such as copper, static electricity introduced from the outside can flow along the conductive foil 126a. The conductive foil 126a may be formed through a plating process when the printed circuit board 121 is formed. After forming the conductive foil 126a, the solder 126b is applied on the surface of the conductive foil 126a. The solder 126b may be formed through a plating process. The solder 126b may be formed of any one of $Sn_{37}Pb$, $Sn_{95}Pb$, SnAg, SnAu, SnCu, SnZn, SnZnBi, SnAgCu, and SnAgBi. The solder 126b inhibits the oxidation of the conductive foil 126a.

The connector 128 is disposed on one surface of the protective circuit module 120. The connector 128 includes a body having a plurality of holes (not shown) so as to be electrically connected to, and disconnected from, an external electronic device, and a plurality of conductive leads (not shown) extending along a constant length to the inside of the holes and the rear upper portion thereof. The body is formed of material, such as insulating resin, to prevent a short circuit between the conductive leads.

The case 130 (FIG. 2), accommodating the battery cells 110 and the protective circuit module 120, includes a bottom case 132 on which the battery cell 110 and the protective circuit module 120 are placed, and a top case 131 covering the bottom case 132.

As seen in FIG. 3, the bottom case 132 has a box shape with an open top surface to accommodate the battery cell 110, and includes a protrusion part on a side to accommodate the protective circuit module 120. The top case 131 is coupled to the upper end of the bottom case 132. The top case 131 also includes a protrusion part which has a recess 131a to expose the connector 128. As such, the top case 131 and the bottom case 132, including the protrusion parts to accommodate the protective circuit module 120, are coupled to each other so as to constitute the appearance of the battery pack 100. The electrostatic protective part 126 of the protective circuit module 120 is disposed at a portion facing a coupling portion 199 between which the top case 131 and the bottom case 132 are coupled. That is, as seen in FIG. 5, the coupling portion 199 between the top case 131 and the bottom case 132 faces the third surface 121c of the printed circuit board 121. Thus, when static electricity is introduced through a gap 130a (FIG. 5) within the coupling portion 199 between the top case 131 and the bottom case 132, the electrostatic protective pan 126 absorbs and transmits the static electricity to the ground, or the positive or negative terminal of the battery cell 110, thus protecting the protective circuit module 120.

A process in which the electrostatic protective part 126, as described above, protects the battery pack 100 from static electricity introduced from the outside will now be described. The battery cell 110 and the protective circuit module 120 are placed on the bottom case 132, and the bottom case 132 is covered with the top case 131 so as to complete the battery pack 100.

At this point, a small gap 130a (FIG. 5) may be formed in the coupling portion 199 between the top case 131 and the bottom case 132. External static electricity may be introduced through the small gap 130a. Specifically, the semiconductor device 127 mounted on the protective circuit module 120 is susceptible to static electricity. Thus, according to the current embodiment, the portion through which static electricity is introduced, that is, the side surface of the protective circuit module 120, is provided with the electrostatic protective part 126 so as to protect the protective circuit module 120, thus improving the reliability of the battery pack 100.

As described above, in the battery pack 100 according to the one embodiment, the electrostatic protective part 126 is disposed on the side surface of the protective circuit module 120, and the electrostatic protective part 126 is connected to the ground pattern. Accordingly, the electrostatic protective part 126 absorbs and transmits static electricity introduced from the outside to the ground so as to prevent breakage of the semiconductor device 127 mounted on the protective circuit module 120, thus improving the reliability of the battery pack 100.

In addition, in the battery pack 100 according to another embodiment, the electrostatic protective part 126 is disposed on the side surface of the protective circuit module 120, and the electrostatic protective part 126 is connected to the positive or negative terminal of the battery cell 110. Accordingly, the electrostatic protective part 126 absorbs and transmits static electricity introduced from the outside to the positive or negative terminal of the battery cell 110 so as to prevent breakage of the semiconductor device 127 mounted on the protective circuit module 120, thus improving the reliability of the battery pack 100.

In addition, in the battery pack 100 according to a further embodiment, the electrostatic protective part 126 is disposed on the side surface of the protective circuit module 120, and the electrostatic protective part 126 is formed by applying the solder 126b on the conductive foil 126a. Accordingly, the oxidation of the conductive foil 126a is inhibited, and thus, the electrostatic protective part 126 absorbs static electricity to protect the protective circuit module 120.

In the battery pack according to the above embodiments, the electrostatic protective part 126 is disposed on the side surface of the protective circuit module 120. Accordingly, the electrostatic protective part 126 protects the protective circuit module 120 from static electricity introduced from the outside so as to improve the reliability of the battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and detail may be made without departing from the spirit and scope of the present invention as set forth in the following claims.

What is claimed is:

1. A battery pack, comprising:
a battery cell;
a protective circuit module electrically connected to the battery cell and including:
a printed circuit board including a first flat surface, a second flat surface disposed opposite to the first flat surface, and a third surface connecting the first and second flat surfaces; and
an electrostatic protective part disposed on the printed circuit board and across the first flat surface, the second flat surface and the third surface of the printed circuit board; and a case accommodating the battery cell and the protective circuit module, the case comprising a top case and a bottom case coupled to the top case, the electrostatic protective part disposed at a portion facing a coupling portion between the top case and the bottom case, and the electrostatic protective part formed of an electrically conductive material.

2. The battery pack as claimed in claim 1, wherein the electrostatic protective part is electrically connected to a ground of the protective circuit module.

3. The battery pack as claimed in claim 1, wherein the electrostatic protective part is electrically connected to one of a positive terminal and a negative terminal of the battery cell.

4. The battery pack as claimed in claim 1, wherein the electrostatic protective part is disposed near a semiconductor device mounted on the protective circuit module.

5. The battery pack as claimed in claim 1, wherein the electrostatic protective part is disposed near a pattern connected to a semiconductor device mounted on the protective circuit module.

6. The battery pack as claimed in claim 1, wherein the electrostatic protective part is formed by applying a solder on a conductive foil.

7. The battery pack as claimed in claim 6, wherein the conductive foil is a copper foil.

8. The battery pack as claimed in claim 6, wherein the conductive foil is formed through a plating process.

9. The battery pack as claimed in claim 6, wherein the solder is formed on a surface of the conductive foil through a plating process.

10. The battery pack as claimed in claim 6, wherein the solder is formed of any one of $Sn_{37}Pb$, $Sn_{95}Pb$, SnAg, SnAu, SnCu, SnZn, SnZnBi, SnAgCu, and SnAgBi.

* * * * *